United States Patent Office 3,532,531
Patented Oct. 6, 1970

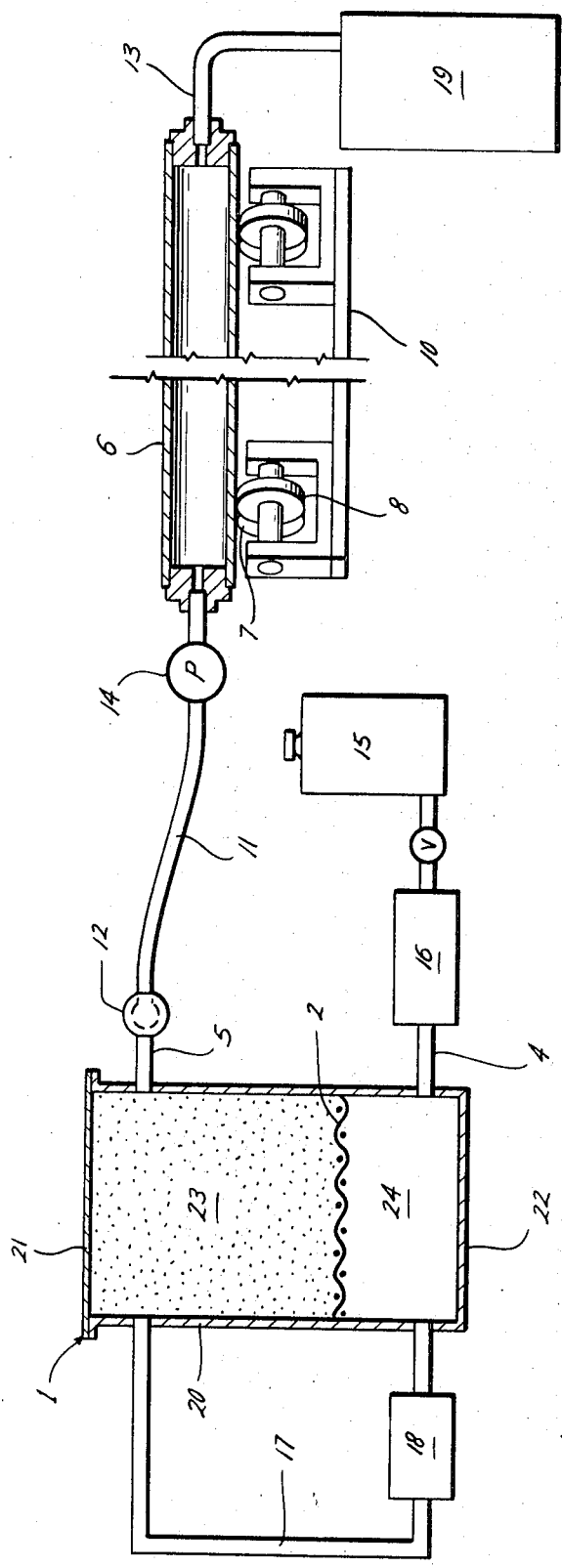

3,532,531
COATING METHOD WITH COOLED PARTICLES FROM A FLUIDIZED BED
Donald N. Stallard, Houston, Tex., assignor to American Machine & Foundry Company, New York, N.Y., a corporation of New Jersey
Filed June 20, 1966, Ser. No. 558,985
Int. Cl. B44d 1/094, 1/095
U.S. Cl. 117—18             12 Claims

ABSTRACT OF THE DISCLOSURE

A method of coating a heated surface such as the inner surface of a pipe with a corrosion resistant material. The material in particle form is withdrawn from a fluidized bed. Cooling the particles in the bed to a temperature below about 0° F. assures a coating of substantially uniform thickness.

---

This invention relates to the coating of materials with a coating applied in particle form from a fluidized bed in a manner suitable for obtaining a coating of more uniform thickness than available in coating methods of the prior art. The invention is especially useful for coating pipe such as pipe used in oil field applications, but may be employed for other materials as well.

Fluidized beds are, of course, well known in the prior art. It is also known to coat materials with particles from a fluidized bed. Past difficulties of such coatings have included irregular and non-uniform coating thicknesses in many instances. This of course is a very serious deficiency for a number of reasons. For example, some areas of the coated material would have too much coating, some areas too little coating. Too much coating means more costly material than necessary was used. Further, irregular and oversize coating thickness, for instance in pipe interiors, can result in undesirable turbulent flow. Too little coating at a point means that corrosion may occur at that point. The seriousness of such a result is quite apparent. The present invention provides a method which yields a coating having a thickness much more uniform than that obtainable with the prior art methods.

Further, in accordance with the present invention, a method is provided which allows faster coating of parts than that available with prior art methods, resulting in more units of coated materials produced in any given time.

Still further, the present invention provides a method which is especially desirable for coating irregular objects and obtaining sharp contours at the points of irregularity. In the prior art, coating irregular objects has been a problem that has never been satisfactorily solved in a simple, convenient manner.

The present invention has still other advantages including the fact that it is quite flexible in that properties of the final product may be readily changed by varying the different parameters.

According to this invention, a bed of dry particles of a material suitable for bonding to the surface of the member to be coated is formed. This bed is chilled by use of a chilling agent to a temperature suitable for producing, in the final product, a coating of substantially uniform thickness. The bed of particles is then fluidized. Desirably, a chilling agent may be chosen which, upon vaporization, is useful in forming this fluidized bed.

The member to be coated is heated to a temperature sufficient for bonding the particles. Particles are then withdrawn from the fluidized bed and brought into contact with the surface of the member to be coated. In many applications, it will be desirable to rotate the member being coated to further promote a uniform-thickness coatings. When a sufficient number of such particles have been contacted with this surface, a smooth coating of substantially uniform thickness is formed. Depending on the thickness and form of the coating desired, any number of passes of such particles again the surface of the member to be coated may be made.

For purposes of illustration, the invention will be explained with reference to one desirable embodiment. It will be readily apparent to those skilled in the art that various changes and modifications may be made in the disclosed embodiment without departure from the scope of the invention. Some of these changes and modifications are described below.

It is of course quite common to coat material such as elongate members with coatings suitable for preventing mechanical damage or corrosion. For example, pipe used in oil field applications or for the transportation of chemicals or petroleum products must be coated in a manner suitable for rendering the pipe corrosion-resistant. The illustrated embodiment of the present invention relates to coating such pipe. Such pipe may be of any suitable diameter, e.g. ½ inch to 6 inches.

In accordance with this embodiment, a material is selected for coating the pipe, the choice of material depending to some extent on the conditions of temperature and pressure the pipe must withstand and the substances which will be in contact with the pipe in use. Since the invention includes the formation of a fluidized bed, such material in powder or small particle form (for example, 50 to 325 mesh) is selected. Examples of coating materials which may be employed are synthetic polymeric materials such as polypropylene, chlorinated polyether, various polyester, certain epoxy and vinyl polymers, polyethylene, polytetrafluoroethylene and nylon. Such materials may be either thermoplastic or thermosetting.

The illustrated embodiment may best be understood by reference to the drawing, wherein:

FIG. 1 is a pictorial view of apparatus useful in performance of the method of such embodiment.

Referring to FIG. 1, a fluidized bed is formed of the selected particles. Such a bed may be conveniently formed by placing a number of the particles in a suitable container such as the drum 1 having a cylindrical side wall 20, top 21, and bottom 22. Suitable means are included for introducing the coating material to the tank. For example, the top 21 is removable. Near the bottom of drum 1 is a gas-pervious porous plate 2 which divides the interior of drum 1 into upper chamber 23 and lower chamber 24.

Such a plate could be merely a rubber disk fitting tightly against the drum around the circumference thereof, such rubber disk having a plurality of hypodermic needles therein. Perhaps more conveniently, the plate may be a stone of synthetic polymeric material which may be obtained from the Polymer Corporation.

Inlet means, such as the pipe 4, provides fluid communication with the chamber 24, and outlet means, such as the pipe 5, provides fluid communication with the chamber 23.

Gas from a suitable source such as the liquid nitrogen tank 15 is passed through the inlet pipe 4 into the chamber 24. If liquid nitrogen is used, as shown in this example, a vaporizing chamber 16 may be included along the inlet line 4 between the tank 15 and the drum 1. A pressure drop is caused to exist between the chambers 24 and 23 by any suitable means such as pressurizing the gas entering through line 4 (it is understood that, for example, the nitrogen in tank 15 will be under a positive pressure). The pressure drop across the plate 2 thus causes the gas to pass through the plate 2 at a velocity sufficient to form a fluidized bed in the upper chamber 23 of the drum.

Additional gas may be supplied by recirculating gas from the upper chamber 23 through the pipe 17. A filter 18 is desirably included in this line to filter out particulate material.

In accordance with this invention, the particles must be chilled. This chilling may be accomplished in any convenient manner, and the sequence of operations is not of primary importance. For example, the particles may be chilled before the fluidized bed is formed, in the fluidized bed, or immediately before contacting with the surface to be coated.

Such chilling may be conveniently accomplished by means of a cooling jacket around the upper chamber 23 of the drum 1, or by a cooling jacket around the outlet pipe 5 from the drum. Another example would include placing Dry Ice inside the drum. The illustrated manner of accomplishing such cooling is by the introduction of a cold gas into the fluidized bed. It has been found particularly desirable in this connection to employ for cooling an agent which is also useful in forming the fluidized bed. For example, liquid nitrogen may be used to effect cooling, and allowed to vaporize to form the fluidized bed. The temperature to which the particles must be lowered is determined somewhat by the nature of the particle employed, the nature and temperature of the pipe being coated, and the particle size of the coating material. But as a general rule, it may be stated that a temperature below about 0° F. is suitable in all applications thus far encountered.

For example, more chilling becomes necessary as particle size decreases, as temperature sensitivity of the particle increases, and as the temperature of the surface to be coated increases. For example, when coating a standard oil field pipe which has been heated to 400° F., the following temperatures have been found suitable:

chlorinated polyether (Penton)—75 F.
epoxy polymer (Michigan Chrome 650) —25° F.
vinyl polymer (Polymer VC–1289) 0° F.
polypropylene 0° F.

The surface to be coated, for example the interior of pipe 6, is pretreated if necessary, as by sandblasting. It may also be desirable in some instances too pretreat the pipe with certain chemical or electrolytic solutions to facilitate bonding.

The pipe 6 is then heated to a temperature sufficient to form a bond with the coating material. This temperature must be above the softening point of the coating material, but below its decomposition point. For example, the typical steel pipe may be heated to a temperature of about 350° F. to about 600° F. Any suitable method may be used for heating the pipe, for instance by use of an oven.

Means are included for communicating the particles withdrawn from the fluidized bed with the interior of pipe 6 thus causing the particles to contact this surface of the pipe and form a coating thereon. To promote the formation of a smooth and uniform coating, it is often desired to rotate the pipe as it is being coated. Such rotation may be accomplished by the rotating wheels 7 and 8 on the pipe support rack 10. The means for communicating the particles may take any convenient form, such as the hose 11 attached, as by swivel connection 12 to the outlet pipe 5 of drum 1. The hose 11 may be placed under vacuum by means, for example, of the vacuum pump 14. Alternatively, the particulate material could be brought into the hose 11 by means of a positive pressure exerted on the drum 1.

As particles are swept through the interior of pipe 6 in a fluid stream and thus brought into contact with the heated internal surface of the pipe, a number of such particles are bonded to the surface to form a smooth coating thereon. When a sufficient number of such particles have been bonded to the pipe to form a coating of the desired thickness, the operation is terminated. If the first pass fails to produce a coating thickness of the required amount, further passes of particulate material through the pipe may be made.

After the particles pass through the pipe, excess particles are drawn through the conduit 13 to a separator receiver 19. Of course any suitable apparatus might be included on the side of pipe 6 opposite the drum 1, including duplicate apparatus (i.e., the drum, and related apparatus) described above.

It is found that the coating obtained in this manner is smooth and the thickness is uniform over the full length of the pipe. Caliper tests of the thickness profile using a micro test instrument reveal no detectable variation in the thickness of the coating. Coatings may range, for example, from about 8 to about 40 mils in thickness.

As stated above, the invention is useful in other environments. For example, an object of irregular shape may be immersed in a fluidized bed chilled in accordance with this invention and coated in this manner.

The examples which follow illustrate how the process may be used and should not be construed to limit the invention. The second example is illustrative of prior art methods.

EXAMPLE I

Three-fourths of a gallon of 200-mesh Penton (a chlorinated polyether available from Hercules Powder Company) is introduced into the drum 1, in the apparatus illustrated in FIG. 1. Liquid nitrogen is introduced into the line 4 into the vaporizing chamber 16. Nitrogen gas is then passed from the vaporizing chamber 16 into the chamber 24 and thence, through the plate 2, into the upper chamber 23 of the drum, whereupon the Penton forms a fluidized bed in the nitrogen. Temperature of the Penton is —75° F. When connected to a rotating 30-foot length of 2-inch steel pipe via apparatus as illustrated in FIG. 1, and a vacuum is pulled on the line 11, the Penton powder is swept through the interior of the pipe, depositing a coating on the interior surface thereof. Measurements with a micro-test instrument reveal that the thickness profile throughout the tube remains constant at about 8 mils.

EXAMPLE II

Example I was repeated except that, instead of the liquid nitrogen of Example I, air under pressure at about 75° F. was introduced into the drum 1, creating a fluidized bed with the Penton particles in the upper chamber of the drum.

The thickness profile of the coated tube was found to vary from about 8 mils, at the end nearest the drum, to about 30 mils at the opposite end of the tube.

EXAMPLE III

Example I is repeated except that the Penton is cooled to only —40° F. Thickness profile in the coated tube is found to vary from about 10 mils to about 8 mils.

EXAMPLE IV

Example I is repeated using two gallons of Penton and a 30-foot length of 4-inch tubing. A constant thickness profile is obtained.

EXAMPLE V

Example I is repeated using, instead of Penton at —75° F., a vinyl resin (Corvel VC–1289, a product of the Polymer Corporation) which is cooled to a temperature of —10° F. The process is used to coat the interior surface of a rotating 30-foot length of pipe which is preheated to 500° F. The thickness profile of the resultant coated pipe is found to be substantially uniform.

The invention is seen to provide a fast and efficient process for the coating of pipe or other objects with a coating of substantially uniform thickness. While the invention has been described in terms of advantageous embodiments, it will be understood to those skilled in the art that various structural changes may be made herein without departing from the scope of the invention.

I claim:
1. A method of coating a suitable surface with a coating of substantially uniform thickness comprising:
   selecting a material in particular form capable of bonding to said surface;
   forming a bed of particles of said material;
   cooling said particles to a temperature below about 0° F. by passage therethrough of a cooling agent;
   causing said chilling agent to form a fluidized bed of said particles;
   heating said surface to be coated to a temperature above the softening temperature of said particles; and
   withdrawing cooled particles in a fluid stream from said fluidized bed and immediately contacting said particles with said heated surface to thereby coat said surface with a coating of substantially uniform thickness.

2. The method of claim 1, wherein said material is a chlorinated polyether.

3. The method of claim 2, wherein said material is cooled to a temperature between about −25° F. and −85° F.

4. The method of claim 1, wherein said surface is a surface of a pipe which is rotated while it is contacted by said particles.

5. A method of coating a suitable surface with a coating of substantially uniform thickness comprising:
   selecting particles of a synthetic polymeric material suitable for bonding to a metal pipe;
   forming a bed of said particles;
   chilling said particles below 0° F. by the passage therethrough of a gas chilling agent;
   allowing said chilling agent to fluidize said bed of particles;
   heating said surface to be coated to about 350–600° F.; and,
   withdrawing cooled particles from said fluidized bed under vacuum, and contacting a sufficient number of said particles with said heated surface to form a coating of substantially uniform thickness thereon.

6. A method of forming a coating of corrosion resistant material on the interior surface of a tubular member to form a coating of substantially uniform thickness comprising:
   forming a fluidized bed of particles of thermoplastic or thermosetting material having corrosion resistant properties;
   withdrawing particles in a fluid stream from said fluidized bed and immediately passing them through the interior of a tubular member that is heated to a temperature above the softening temperature of said material; and
   cooling said particles to a temperature below about 0° F. before the withdrawn particles are passed through said tubular member.

7. The method of claim 6, wherein said surface is heated to a temperature of from about 350° F. to about 600° F.

8. The method of claim 6, wherein said material is a synthetic polymer.

9. The method of claim 6, wherein said material is selected from the group consisting of chlorinated polyether, polyethylene, and polypropylene.

10. The method of claim 6, wherein said cooling is accomplished by the passage therethrough of a gas cooling agent, said gas also forming the fluidized bed.

11. The method of claim 10, wherein said cooling agent is nitrogen gas.

12. A method of coating a surface with a coating of substantially uniform thickness comprising:
   forming a fluidized bed of particles of temperature-sensitive material capable of forming a continuous coating on the surface of a heated member;
   cooling said particles to a temperature below about 0° F.;
   heating said surface to a temperature above the softening temperature of said particles; and
   contacting said heated surface with said cooled particles to thereby coat said surface with a coating of substantially uniform thickness.

References Cited

UNITED STATES PATENTS

| | | | |
|---|---|---|---|
| 3,110,626 | 11/1963 | Larson et al. | |
| 3,137,781 | 6/1964 | Tanaka | 219—50 |
| 3,138,483 | 6/1964 | Dettling et al. | 118—408 |
| 3,279,936 | 10/1966 | Forestek | 117—16 |
| 2,706,311 | 4/1955 | Durst et al. | 264—36 |
| 3,063,860 | 11/1962 | Gemmer. | |
| 3,074,808 | 1/1963 | Harrison | 117—21 |
| 3,090,696 | 5/1963 | Gemmer. | |
| 3,108,022 | 10/1963 | Church | 117—21 |
| 3,186,860 | 6/1965 | Jones | 117—21 |
| 3,202,533 | 8/1965 | Sachsel et al. | |
| 3,207,618 | 9/1965 | De Hart | 117—21 |
| 3,376,152 | 4/1968 | Okamoto et al. | 117—21 |

FOREIGN PATENTS 671,775  10/1963  Canada.

WILLIAM D. MARTIN, Primary Examiner

R. M. SPEER, Assistant Examiner

U.S. Cl. X.R.

117—21